Sept. 7, 1926.
T. V. BUCKWALTER
PROCESS OF ASSEMBLING AXLE CONSTRUCTIONS
Filed Dec. 31, 1925
1,598,599
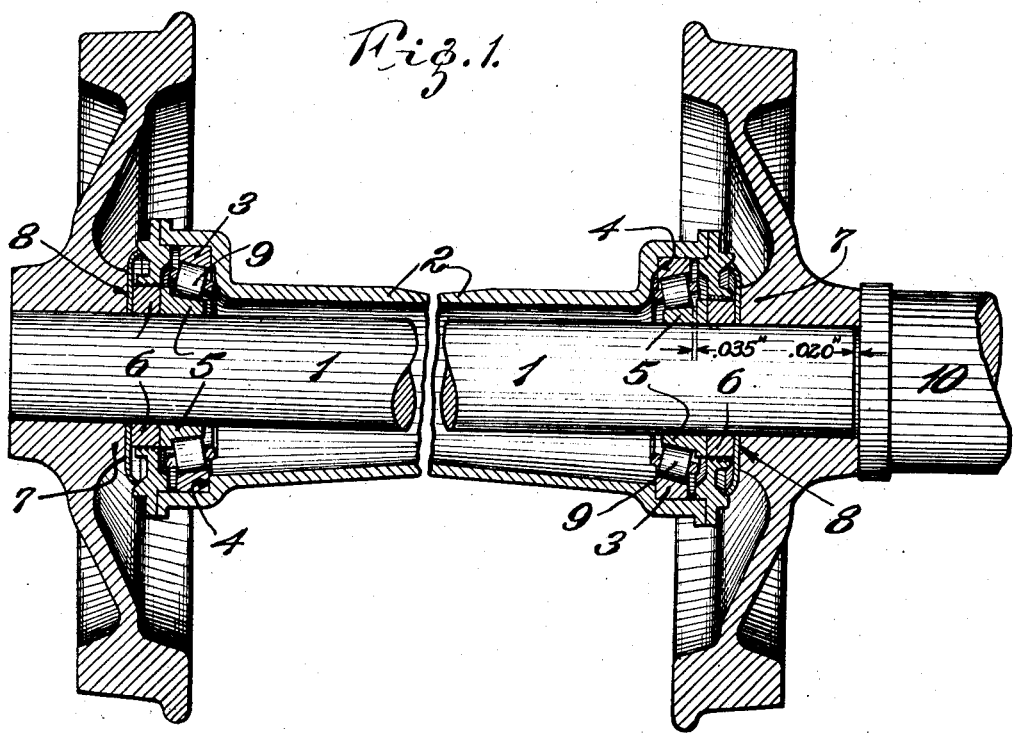
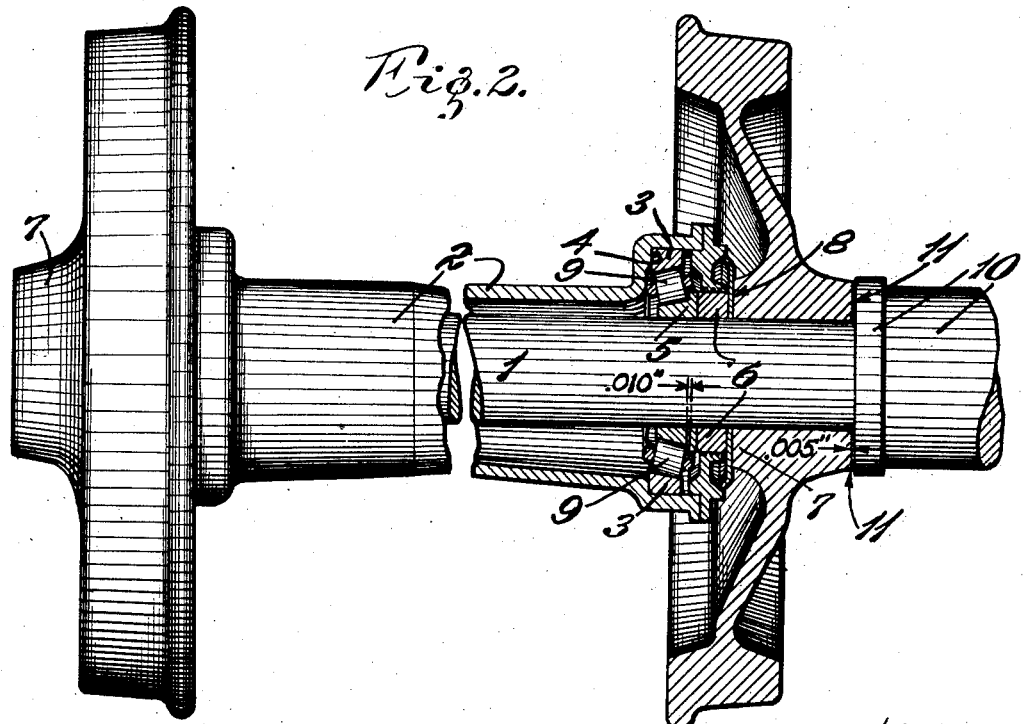

Patented Sept. 7, 1926.

1,598,599

UNITED STATES PATENT OFFICE.

TRACY V. BUCKWALTER, OF CANTON, OHIO, ASSIGNOR TO THE TIMKEN ROLLER BEARING COMPANY, OF CANTON, OHIO, A CORPORATION OF OHIO.

PROCESS OF ASSEMBLING AXLE CONSTRUCTIONS.

Application filed December 31, 1925. Serial No. 78,685.

My invention relates to a process of press-fitting wheels on axles, and has for its principal object to insure the accurate placement of said wheels and the accurate adjustment of their bearings. It has long been common practice to press car wheels upon solid axles; and it has been proposed to apply this practice to constructions wherein tapered roller bearings are interposed between the solid axle and the ends of a hollow housing that encases said solid axle. It has been a difficult matter, however, to position the wheels with the precision required for the proper adjustment of such bearings; and the principal object of the present invention is to devise a practicable and economical process of positioning the wheels with the precision required for such bearings. The invention consists in the process hereinafter described.

In the accompanying drawing, which forms part of this specification and wherein like numerals refer to like parts wherever they occur:

Fig. 1 is a longitudinal sectional view of an axle construction in its semi-final stage of assembly, with the ram of the press shown at the limit of its strike; and Fig. 2 is a similar view of the axle at the end of its final stage of assembly, with the ram of the press at the limit of its stroke and with a shim interposed between said ram and the hub of the wheel.

The axle construction illustrated in the accompanying drawing comprises a solid axle 1, tubular housing 2 encasing the solid axle, and tapered roller bearings interposed between the solid axle and the respective ends of said housing. Each of the roller bearings comprises a cup 3 which fits in a recess provided therefor by enlarging the diameter of the end portion of the housing, thus providing a shoulder 4 against which the large end of said cup bears. Each of said bearings also comprises a cone 5 mounted on the solid axle and capable of being moved endwise thereof, the large end of the cone bearing against a ring or collar 6 which in turn bears against the hub 7 of the axle wheel or against an oil or dust ring 8 that is interposed between said collar and said hub. Suitable antifriction rollers 9 are interposed between the cup and the cone.

In practice, the cups 3 of the bearings are pressed into the ends of the housing 2 and seated against the shoulders 4 thereof. The other parts of a bearing and the parts associated therewith are then slipped over one end of the solid axle and pressed into proper position thereon by pressing one wheel onto said end of said axle with the outer face of its hub flush therewith. The housing is then slipped over said solid axle, and the remaining parts of the other bearing and the parts associated therewith are then placed in position on said axle, and the hub of the other car wheel is then pressed onto the end of said axle.

The operation of pressing the wheels onto the solid axle requires considerable power and is effected by a heavy hydraulic press. When the second wheel is being mounted, the axle is rigidly held and the ram 10 of the press bears axially against the end of the hub of the car wheel, which hub projects beyond the other end of said axle. The work is so positioned relative to the ram that the end of the solid axle functions as a stop for limiting the forward movement of said ram; and the initial movement of the ram is terminated slightly before the ram reaches this limit, so that said hub will still project slightly beyond said axle and the housing will be permitted to play endwise relatively of the solid axle slightly more than is permissible for the proper adjustment of the roller bearings. The amount of this play is easily measurable by a suitable instrument; and likewise the extent to which the hub projects beyond the end of the solid axle is easily measurable, and the difference between them indicates the distance the wheel would have to be moved to take up all play of the housing endwise of the axle. As, however, proper adjustment of the bearings requires a slight play, the amount of such slight play is deducted from said difference and an annular shim 11 of a larger inside diameter than the diameter of the axle is interposed between the hub of the wheel and the head of the ram and the ram is made to move forward until it contacts with the end of the solid axle and thereby presses the wheel home. By this movement of the wheel, the bearing parts are adjusted with great precision. For instance, suppose the endwise play of the housing in the semi-final stage indicated by Fig. 1 amounts to thirty-five thousandths of an inch (.035″), and that the hub of the wheel projects twenty thousandths of an inch (.020") beyond the end of the solid axle, and that the play required for the proper adjustment of the bearings amounts to ten thousandths of an inch (.010"): then from the thirty-five thousandths of an inch (.035"), representing the actual play of the housing in the semifinal stage, are deducted, first, the twenty thousandths of an inch (.020"), representing the projection of the hub beyond the end of the axle, and second, the ten thousandths of an inch (.010"), representing the play desired for the final adjustment, leaving a remainder of five thousandths of an inch (.005"), which remainder indicates the thickness of the shim required for obtaining such accurate adjustment and also indicating the distance which the end of the solid axle projects beyond the hub of the wheel in the final adjustment.

It is noted that after the work is once placed in proper position with reference to the ram, neither the work nor the ram requires any adjustment; and it is also noted that even if the parts of the axle construction depart appreciably from the dimensions specified therefor, the selection of the shim or shims of proper thickness will insure the precise adjustment of the bearings. While the foregoing description is particularly applicable to axle constructions of the type illustrated, it is also applicable to other constructions; and, of course, some other limiting stop may be used instead of the solid axle.

What I claim is:

1. The process of assembling the parts of an axle construction wherein a solid axle with wheels press-fitted thereon is enclosed in a tubular housing with roller bearings interposed between said solid axle and the ends of said housing, which consists in initially assembling all of the parts except one wheel, pressing said wheel endwise to a position slightly short of its final position, measuring the further distance to which the limiting devices will permit said wheel to be pressed and also measuring the endwise play of the housing relative to said solid axle, placing a shim of less thickness than the difference between said measurements over the end of the hub of said wheel, and again pressing said wheel home endwise of the axle.

2. The process of assembling the parts of an axle construction wherein a solid axle with wheels press-fitted thereon is enclosed in a tubular housing with taper roller bearings interposed between said solid axle and the ends of said housing, which consists in initially assembling all of the parts except one wheel, pressing said wheel endwise to a position slightly short of the final position, measuring the further distance to which the limiting devices will permit said wheel to be pressed and also measuring the endwise play of the housing relative to said solid axle, placing a shim of less thickness than the difference between said measurements over the end of the hub of said wheel, and again pressing said wheel home endwise of the axle.

3. The process of assembling the parts of an axle construction wherein a solid axle with wheels press-fitted thereon is enclosed in a tubular housing with roller bearings interposed between said solid axle and the ends of said housing, which consists in initially assembling all of the parts except one wheel, pressing said wheel endwise to a position slightly short of its final position, measuring the endwise play of the housing relative to said solid axle and the further possible movement of the wheel on said axle, interposing between said wheel and the pressure device a shim whose thickness is less than the difference between these measurements by an amount equal to the play suitable for proper adjustment of the bearings, and again pressing said wheel home on said axle.

4. The process of assembling the parts of an axle construction wherein a solid axle with wheels press-fitted thereon is enclosed in a tubular housing with taper roller bearings interposed between said solid axle and the ends of said housing, which consists in intially assembling all of the parts except one wheel, pressing said wheel endwise to a position on said axle slightly short of its final position and with its hub projecting beyond said axle, measuring the endwise play of the housing relative to said solid axle and the extent of such projection, placing over the end of the hub of said wheel an annular shim of less thickness than the difference between said measurements, and again pressing said wheel endwise of the axle until the shim at the end of the hub of the wheel becomes flush with the end of said axle.

Signed at Canton, Ohio, this 21st day of December, 1925.

TRACY V. BUCKWALTER.